United States Patent
Ross et al.

(10) Patent No.: US 7,324,815 B2
(45) Date of Patent: Jan. 29, 2008

(54) REMOTE INTERACTION WITH A WIRELESS DEVICE RESIDENT DIAGNOSTIC INTERFACE ACROSS A WIRELESS NETWORK

(75) Inventors: David J. Ross, San Diego, CA (US); Jason B. Kenagy, San Diego, CA (US); Jin Dai, San Diego, CA (US); Tia M. Cassett, San Diego, CA (US); Daniel H. Agre, San Diego, CA (US); Mazen Chmaytelli, San Diego, CA (US); Arne Croizat Joseph Mortensen, San Diego, CA (US); Ravinder Chandhok, Poway, CA (US); Patrick Tierney, San Diego, CA (US); Paul M. Seckendorf, San Diego, CA (US); Mo Ip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1065 days.

(21) Appl. No.: 10/413,702

(22) Filed: Apr. 15, 2003

(65) Prior Publication Data

US 2004/0058651 A1 Mar. 25, 2004

Related U.S. Application Data

(63) Continuation-in-part of application No. 10/187,760, filed on Jul. 1, 2002.

(51) Int. Cl.
*H04Q 7/20* (2006.01)
(52) U.S. Cl. .................. 455/425; 455/423; 455/419
(58) Field of Classification Search ............... 455/418, 455/419, 420
See application file for complete search history.

(56) References Cited

U.S. PATENT DOCUMENTS

| | | | |
|---|---|---|---|
| 5,657,283 A * | 8/1997 | Hill | 365/201 |
| 5,694,451 A | 12/1997 | Arindell | 379/34 |
| 6,088,588 A | 7/2000 | Osborne | 455/425 |
| 6,445,907 B1 | 9/2002 | Middeke et al. | 455/226.1 |
| 6,459,894 B1 | 10/2002 | Phillips et al. | 455/424 |
| 6,594,548 B2 * | 7/2003 | Bagnordi | 700/233 |
| 6,640,253 B2 * | 10/2003 | Schaefer | 709/248 |
| 6,690,923 B1 * | 2/2004 | Ortiz Perez et al. | 455/74.1 |
| 6,745,011 B1 | 6/2004 | Hendrickson et al. | 455/67.11 |
| 6,751,457 B1 | 6/2004 | Martin | 455/424 |
| 6,754,470 B2 | 6/2004 | Hendrickson et al. | 455/67.11 |
| 6,832,373 B2 | 12/2004 | O'Neill | 717/171 |
| 7,043,237 B2 * | 5/2006 | Snyder et al. | 455/425 |
| 7,242,862 B2 * | 7/2007 | Saunders et al. | 398/30 |
| 2002/0072359 A1* | 6/2002 | Moles et al. | 455/425 |
| 2004/0165533 A1* | 8/2004 | Izundu et al. | 370/241 |
| 2005/0096028 A1* | 5/2005 | Oommen | 455/418 |

* cited by examiner

*Primary Examiner*—Creighton Smith
(74) *Attorney, Agent, or Firm*—Robert J. O'Connell; Nicholas A. Cole; Thomas Rouse (57) ABSTRACT

A system, method, and program for remotely interacting with a diagnostic interface resident on wireless computer devices. The wireless device provides an accessible diagnostic interface that allows reads and/or writes to device resident diagnostic data and tools. Through use of the interaction, wireless device status data and network status data can be gathered and utilized, and if so embodied, the diagnostic tools resident on the wireless devices can be manipulated to alter wireless device operation.

81 Claims, 5 Drawing Sheets

REMOTE INTERACTION WITH A WIRELESS DEVICE RESIDENT DIAGNOSTIC INTERFACE ACROSS A WIRELESS NETWORK

CROSS-REFERENCE TO RELATED APPLICATION

This application is a continuation-in-part of U.S. patent application Ser. No. 10/187,760, filed Jul. 1, 2002, which application is incorporated herein by reference.

BACKGROUND OF THE INVENTION

I. Field of the Invention

The present invention generally relates to computer networks and communications across wireless computer networks. More particularly, the invention relates to the collection and analysis of data from remote devices, provided from a device-resident diagnostic interface, on a wireless network.

II. Description of the Related Art

Wireless networking connects one or more wireless computer devices to other computer devices without a direct electrical connection, such as a copper wire or optical cable. Wireless computer devices communicate data, typically in the form of packets, across a wireless or partially wireless computer network and open a "data" or "communication" channel on the network such that the device can send and receive data packets. The computer devices often have computer device resources, such as programs and hardware components, which individually use open communication connections to transmit and receive data on the network.

In wireless networking, a peer-to-peer (or point-to-point) wireless network means that each computer can communicate directly with every other computer on the network. A cellular telecommunication network can be a wireless network wherein the cellular devices transmit voice or data packets across the cellular network. As used herein, the term "cellular" includes a telecommunication network of any frequency band including, but not limited to the common wireless networks operating at 800 MHz, 1900 MHz, 450 MHz, 1800 MHz, and 2100 MHz, and all forms of wireless networks, to include CDMA, GSM, TDMA, WCDMA, and UMTS. Some wireless networks are in client/server architecture, and have an access point, which is a wired controller that receives and transmits data to the wireless adapters installed in each computer. There are generally four types of wireless computer networks: Bluetooth, Infrared Data Association, HomeRF (SWAP); and WECA (Wi-Fi).

Bluetooth is not widely available yet and is not expected to replace the need for high-speed data networks between computers. Infrared Data Association (IrDA) is a standard for computer devices to communicate using infrared light pulses, similarly to how remote controls operate. Since IrDA computer devices use infrared light, they depend on being in direct line of sight with each other. An IrDA-based network is currently capable of transmitting data at speeds up to 4 megabits per second (Mbps). HomeRF, RF standing for radio frequency, is based upon a standard called Shared Wireless Access Protocol (SWAP), with is a hybrid standard including six voice channels based on the digital enhanced cordless telecommunications (DECT) standard and the IEEE 802.11 wireless-Ethernet specification for data. SWAP devices make 50 hops per second and transmit at 1 Mbps. In most cases, SWAP-based networks are point-to-point. The Wireless Ethernet Compatibility Alliance (WECA) is essentially compliant with a variation of the IEEE 802.11 specification known as IEEE 802.11b. This specification focuses on direct-sequence spread spectrum (DSSS) transmission because of the higher data rate it can attain. Under 802.11b, devices communicate at a speed of 11 Mbps whenever possible.

There are many diagnostic tools usable with an extant wireless network that can give technicians feedback and performance data such that the network can be optimized among the various nodes thereof. In cellular networks, one method to gather network data is to equip automobiles with diagnostic equipment and have them drive around the cell coverage area and record connectivity with the cellular base stations. This method however is expensive to implement, time consuming, and often cannot obtain data for the full coverage area of the cell.

Moreover, the existing wireless telecommunication devices include resident diagnostic tools on their computer platform which are typically included at the time of manufacture. The manufacture accesses the diagnostic tools through a serial port or other wired connection and evaluates the operating parameters of the wireless device and the manufacture will appropriately adjust the hardware or software parameters of the device to yield optimal performance. These diagnostic tools are normally inaccessible remotely without a serial port connection.

Accordingly, it would be advantageous to provide a system and method that allows access to the diagnostic interface resident on the wireless device that is ordinarily not remotely accessible, thus providing remote access to diagnostic data and tools. The system and method may be implemented within existing software resident on the wireless device and without causing interruption of the existing data communication occurring across the wireless network. Further, such system should be able to take advantage of manipulating extant commands available on the chipset of the wireless device. It is thus to the provision of such a system and method of providing a remotely accessible diagnostic interface that the present invention is primarily directed.

SUMMARY OF THE INVENTION

The present invention is a system, method, and program for accessing a remote diagnostic interface on a wireless device in a wireless network having at least data communication between computer devices selectively connected thereto, such as cellular telecommunication devices on a cellular telecommunication network. The system particularly utilizes existing diagnostic interfaces on the wireless device to obtain status data such as device performance parameters and/or other network information, and can use commands to the diagnostic tools to alter device operations. In the system, a wireless network with at least data communication from computer devices selectively connected thereto has and a plurality of wireless devices located remotely from each other and each in selective communication with other computer devices across the wireless network. Each wireless device includes a computer platform, which can have an end user thereof, and the computer platform further includes a resident diagnostic interface for at least accessing status data that can include either device status data for the operating parameters of the wireless device, or network status data, or both, and the resident diagnostic interface is selectively accessible by other computer devices across the wireless network. Thus, other computer devices can access the diagnostic interface and at least get data therefrom, and alternately, can send commands to the diagnostic interface and alter the wireless device's and/or the wireless network's functionality.

The method for remotely interacting with a diagnostic interface of a wireless device across a wireless network includes the steps of establishing the wireless network between computer devices, with at least one of the computer devices a remotely located wireless device including a computer platform. The wireless device includes a resident diagnostic interface through which at least the status data (either of the device, network, or both) is accessible, and the method includes the step of accessing the wireless device diagnostic interface from another computer device across the wireless network, and then gathering at least status data of the wireless device through the wireless device diagnostic interface. If so embodied, the method can include the step of transmitting commands to the diagnostic interface of the wireless device to manipulate the device's operating parameters.

It is therefore an object of the system and method to provide remote access the resident diagnostic interface of a wireless device to access device data and tools. The system and method thus provide significant and valuable wireless device status and network status data detailing operation parameters to other devices on the network. Further, through commands to the diagnostic interface and manipulation of the wireless devices' diagnostic tools, the wireless device's functionality and network can be altered which assists in such functions as problem-solving and network optimization. The system and method thus provide an advantage in that the remote wireless devices in a wireless network, such as a cellular telecommunication network, can have their basic operational data accessed without compromising the functionality of the network, or the need to use external monitoring equipment or provide new equipment on the wireless device. In one embodiment, the access to the diagnostic interface can be created with a simple software extension within the device operating system that allows direct access to the chipset diagnostic interface. Alternately, an application (or software agent) can be downloaded to or manufactured in the wireless devices to provide the access an existing or new diagnostic interface, and can cause data to be transmitted from the interface to another computer device on the wireless network.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
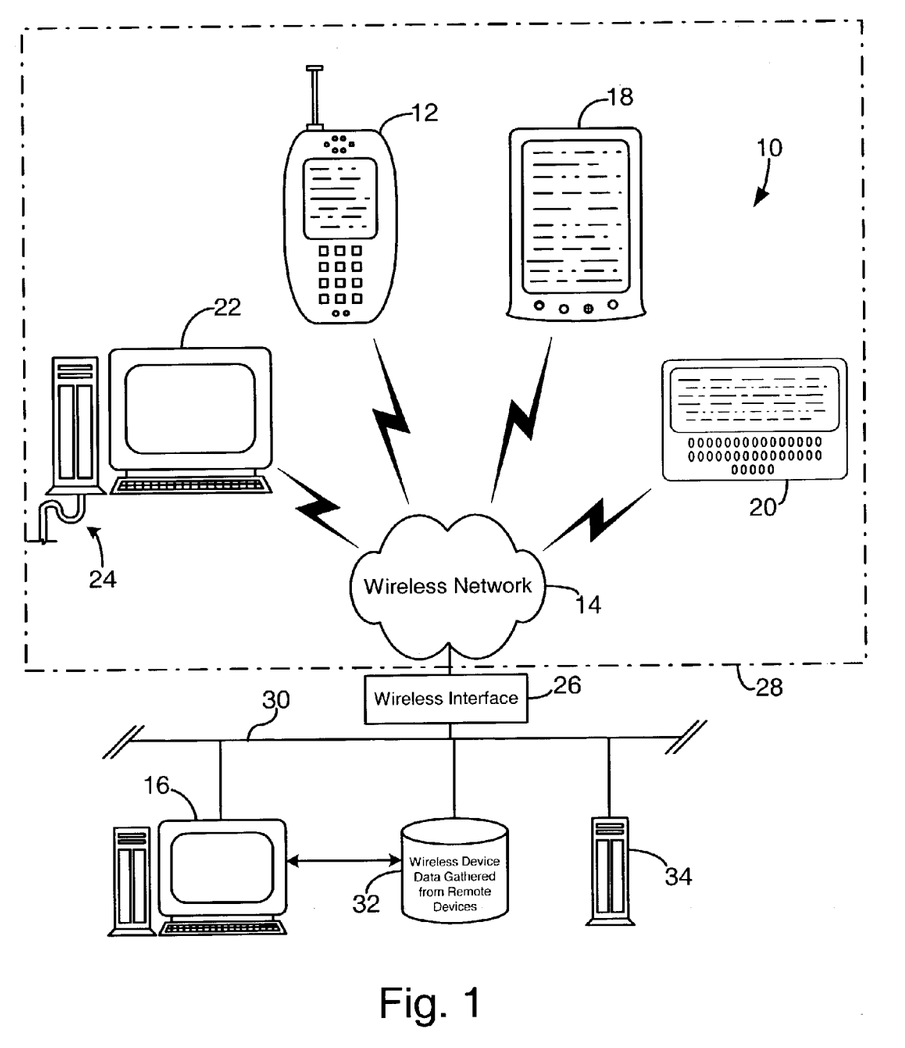
FIG. 1 is a representative diagram of one embodiment of a wireless network, with a partial LAN, having several computer devices that communicate with each other across the network.

With reference to the figures in which like numerals represent like elements throughout, FIG. 1 illustrates a wireless network 10 having a plurality of computer devices 12,18,20, and 22 in a wireless network area 28. The wireless network 14 is connected through an interface 26 to a LAN-based network 30, with preferably at least one wireless device status data-gathering and/or managing server 16, and in this embodiment, the server 16 can selectively download software applications or agents to the wireless devices 12,18,20,22 across the wireless interface 26 such that the wireless device can supply status data back to the server 16 as is further described herein. Such computer devices can include wireless devices, such as cellular telephone 12, a personal digital assistant 18, a two-way text pager 20, or even a separate computer platform 22 that has a wireless communication portal, and may otherwise have a wired connection 24 to a network or the Internet. The wireless device can be a remote-slave, or other device that does not have an end-user thereof but simply communicates data across the wireless network 14, such as remote sensors, diagnostic tools, data relays, and the like. The system and method can accordingly be performed on any form of computer device computer module including a wired or wireless communication portal, including without limitation, wireless modems, PCMCIA cards, access terminals, personal computers, access terminals, telephones without a display or keypad, or any combination or sub-combination thereof.

Figure 2:
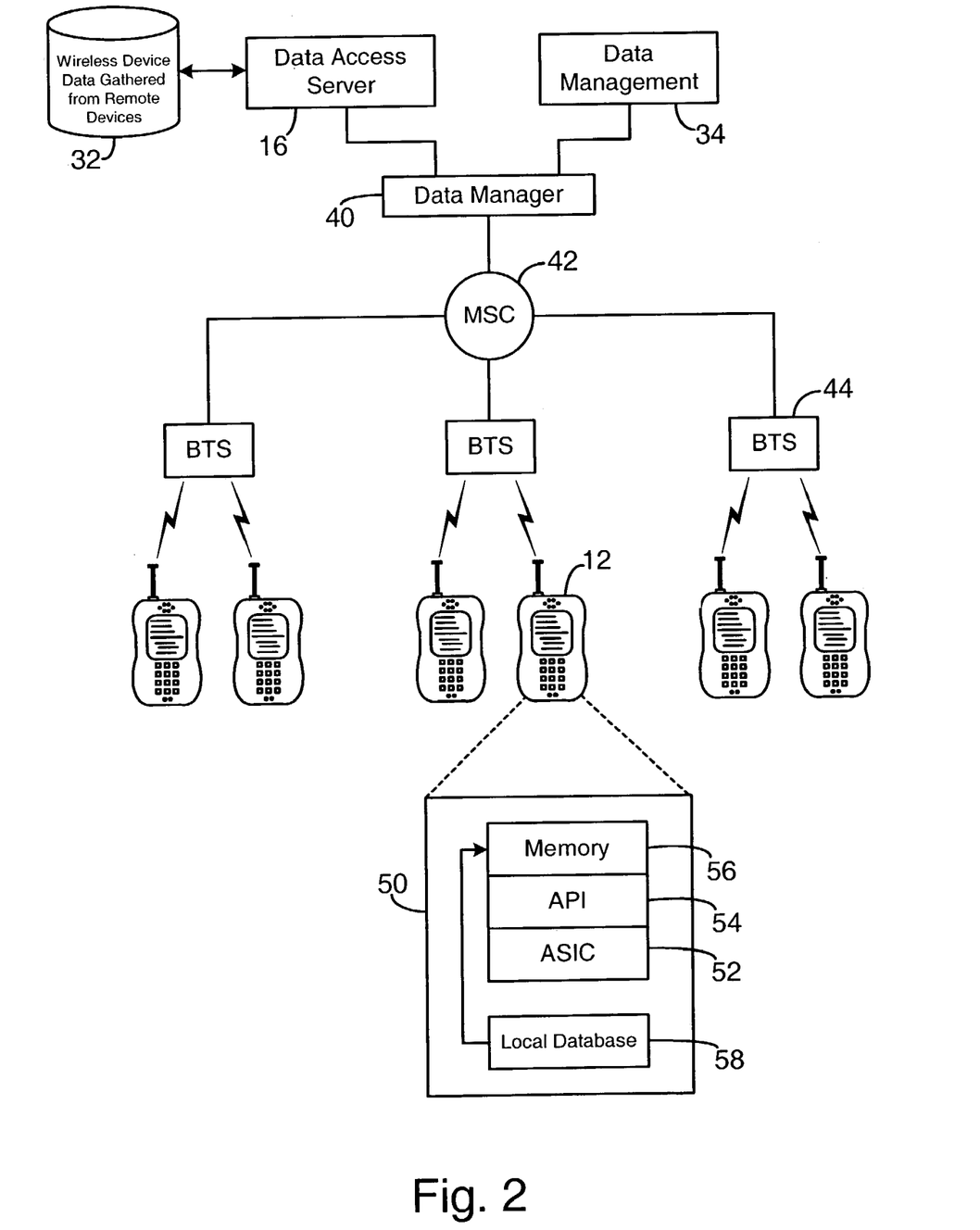
FIG. 2 is a block diagram of the hardware components of the system embodied on a cellular wireless network providing communication between different wireless devices, such as cellular telephones, and computer devices.

The use of cellular telecommunication pathways has been increasing because wireless devices, such as cellular telephone 12, are being manufactured with increased computing capabilities and are becoming tantamount to personal computers and hand-held personal digital assistants ("PDAs"), communicating packets including voice and data over the wireless network. These "smart" cellular telephones have installed application programming interfaces ("APIs") onto their local computer platform that allow software developers to create software applications that operate on the cellular telephone, and control certain functionality on the device. FIG. 2 is a block diagram that more fully illustrates the components of a cellular wireless network and interrelation of the elements of the present system. The cellular wireless network is merely exemplary and can include any system whereby remote modules, such as wireless devices 12,18, 20,22, communicate over-the-air between and among each other and/or between and among components of a wireless network 14, including, without limitation, wireless network carriers and/or servers.

Figure 5:
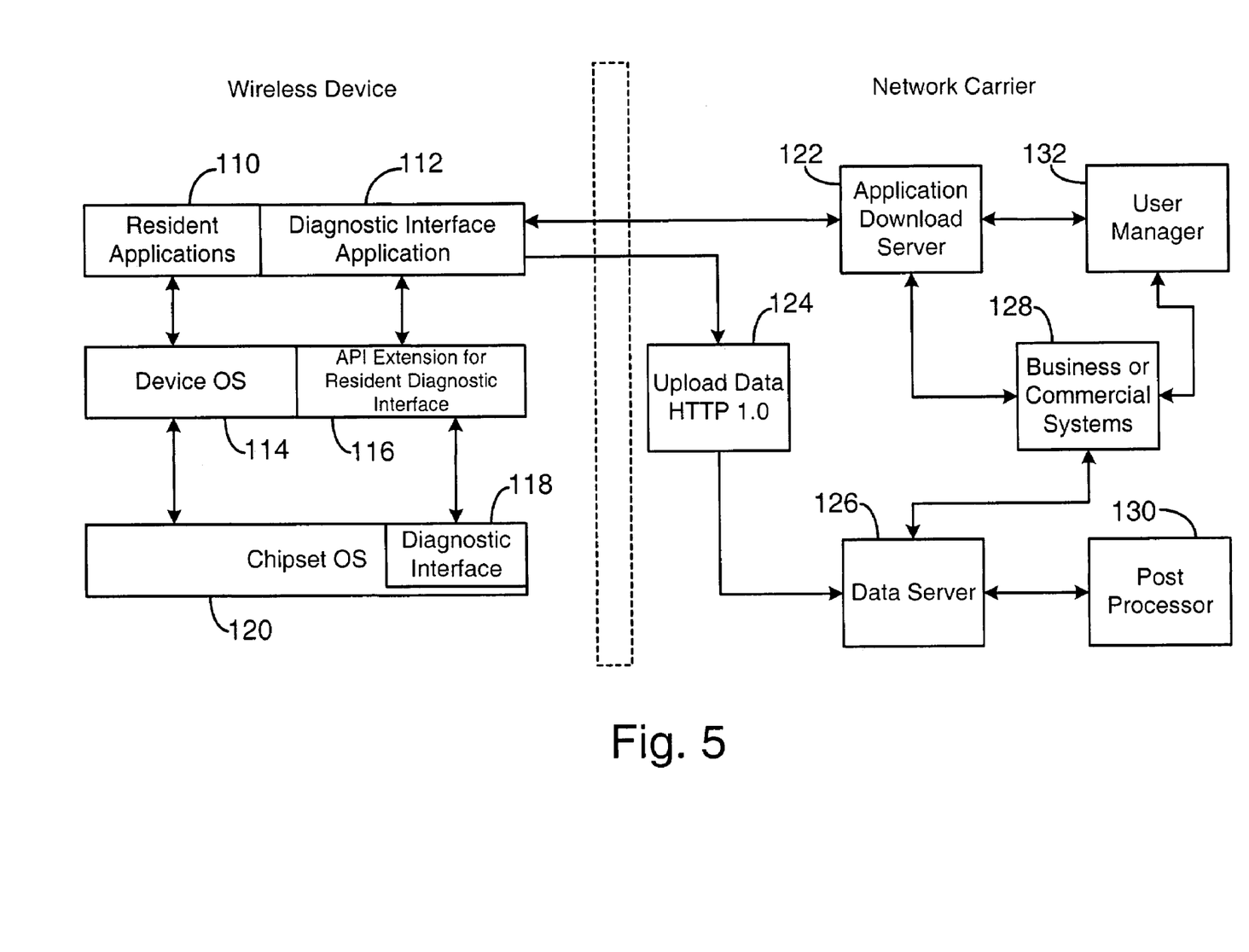
FIG. 5 is an architecture diagram of the interaction between the carrier-side devices and the diagnostic interface resident at the wireless device.

The system 10 can utilize the existing wireless device diagnostic interface and any resident tools that are manufactured with the device, such as data throughput, signal strength, ASIC diagnosis, graphics display, dropped call statistics, access probe statistics, RX sensitivity, transmission power, and other hardware and software diagnostic tools resident on the wireless device common in the art. The data at the diagnostic interface is indicative of wireless device performance, and some of the data can be indicative of network status and performance issues. Both types of data can be supplied in the system 10. The device operational parameter data are typically accessed from a serial connection at the time of manufacture or serving and are not traditionally available as data reads or writes from a wireless device computer platform 50 (FIG. 2). In one embodiment, the wireless device 12,18,20,22 of the system 10 provides a software extension on the computer platform 50 of the wireless device such that program calls can be made to the resident diagnostic interface, and any individual diagnostic tools, from a resident layer on the wireless device, which can be as rudimentary as ASIC or processor microcode to as advanced as an OS layer of the wireless device, as is shown in FIG. 5.

Through the use of the diagnostic interface software extension, a remote server 16 at least reads status data therefrom, and in some instances, writes commands to the interface and alters the operation of the wireless device 12,18,20,22. Accordingly, the access to the remote device diagnostic interface allows network optimization, customer interaction, remote wireless device monitoring, device testing and certification, and the gathering of specific user information for a wireless device.

On the LAN network 30, the server 16 can be in communication with a separate storage 32 for the data gathered from the remote wireless devices 12,18,20,22, such as device status data. The server 16 and its corresponding PC or data access can give a ready view of the wireless device status data collected from the wireless devices in any form, such as tables, maps, graphics views, plain text, or any other display as would be known to known of skill in the art. The server 16 (or plurality of servers) can send software agents or applications to wireless devices 12,18,20,22 in the wireless network area 28 such that the wireless devices return data from their resident diagnostic interface, such as system performance data, user ID, geographic position, Network ID, System ID, model ID, resident software, and the like. The wireless devices 12,18,20,22 then transmit the requested status data to the server 16, or other computer device on the network, wherein the data can be used for purposes such as network optimization, even in real-time or near-real-time if desired, device diagnosis, or data mining on end-user device usage. Further, there can be a separate data management server 34 resident that works in concert to provide data in usable formats to parties and/or a separate layer of control in the data flow between the wireless devices 12,18,20,22 and the server 16 or data storage 32.

The wireless device status data-gathering server 16 and the wireless device status and, in this embodiment, a network optimization database 32, and data management server 34, will be present on the cellular data network with any other components that are needed to provide cellular telecommunication services. The server 16, and/or data management server 34 communicate with a carrier network through a data manager 40, through a data link, such as the Internet, a secure LAN, WAN, or other network. The carrier network controls messages (generally being data packets) sent to a messaging service controller ("MSC") 42. The carrier network communicates with the MSC 42 by a network, the Internet, and/or POTS ("plain ordinary telephone system"). Typically, the network or Internet connection between the carrier network and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

Each wireless device, such as cellular telephone 12, has a computer platform 50 that can receive and execute software applications and display data transmitted from the application download server 16 or other network servers 34. The computer platform 50 also includes an application-specific integrated circuit ("ASIC") 52, or other chipset, processor, microprocessor, logic circuit, or other data processing device. The ASIC 52 is installed at the time of manufacture of the wireless device and is not normally upgradeable. The ASIC 52 or other processor executes the application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications, file, or data not actively used in memory 56, such as the software applications or data downloaded from the server 16. The local database 58 is typically comprised of one or more flash memory cells, but can be any secondary or tertiary storage device as known in the art, such as magnetic media, EPROM, EEPROM, optical media, tape, or soft or hard disk. The local database 58 can ultimately hold a resident copy of a network optimization application or agent as is further described herein In one embodiment, the wireless device diagnostic interface can be accessed through a class of software commands on the wireless device 12,18,20,22. A software class extension can communicate with the diagnostic tools of the phone, which allows both data reads and commands. This class can send commands, including register for log messages and event notifications, on behalf of the applications that invoke it. The class object can then forward the responses of the diagnostic tools units to the applications or ultimately across the network. Notifications of connection and disconnection of external interfaces (outside the wireless device) can be sent to applications if they register with the device manager for notice. Each wireless device resident application can create an instance of this new software class to communicate with the diagnostic tools independently. Such internal connections, i.e. among applications and the diagnostic tools, operate independently and can also operate simultaneously with an external interface, but the external interface has the option to also monitor the internal interface.

Thus, in one embodiment, the system 10 can push at least one network optimization application to be resident, at least temporarily, on the computer platform 50 of each wireless device 12,18,20,22 that causes that wireless device to selectively transmit wireless device status data for that wireless device and/or network status to another computer device on the wireless network. Alternately, the network optimization application can be placed on the platform 50 at the time of manufacture or initial programming, or the wireless device 12,18,20,22 can "pull" the application from another computer device on the network, such as server, either with a request from the end-user, or automatically. The status data can include, but is not limited to, data from both the diagnostic tools and from other device components, such as signal strength, Ec/Io, Latitude-Longitude or other geographical data, Time, FER, BER, RSSI, PN, System ID, or Network ID, Model ID, and can capture wireless device 12,18,20,22 state data, such as idleness, data or voice call, dormancy or inoperation, which is generated from wireless device operation. Moreover, the wireless device status data can allow for specific troubleshooting of a device within the wireless network 14 based upon the gathered status data. The network optimization application or agent can be permanently stored in the local database 58 of the wireless device computer platform 50, or can only be temporarily held in memory 56 thereof for a one time (or n-time) execution to transmit network status data.

In one embodiment, the network optimization application transmits the wireless device status data from that wireless device 12,18,20, 22 to a server 16 across the wireless network 14 when requested. Alternately, the network status data is transmitted over an open communication connection from the wireless device 12,18,20,22 to the wireless network 14, and thus "piggybacked" across an open connection, such as a voice or data call at the cellular telephone 12. In a cellular network configuration such as that shown in FIG. 2, the wireless device status data can be transmitted to the server 12 through short message service.

Figure 3:
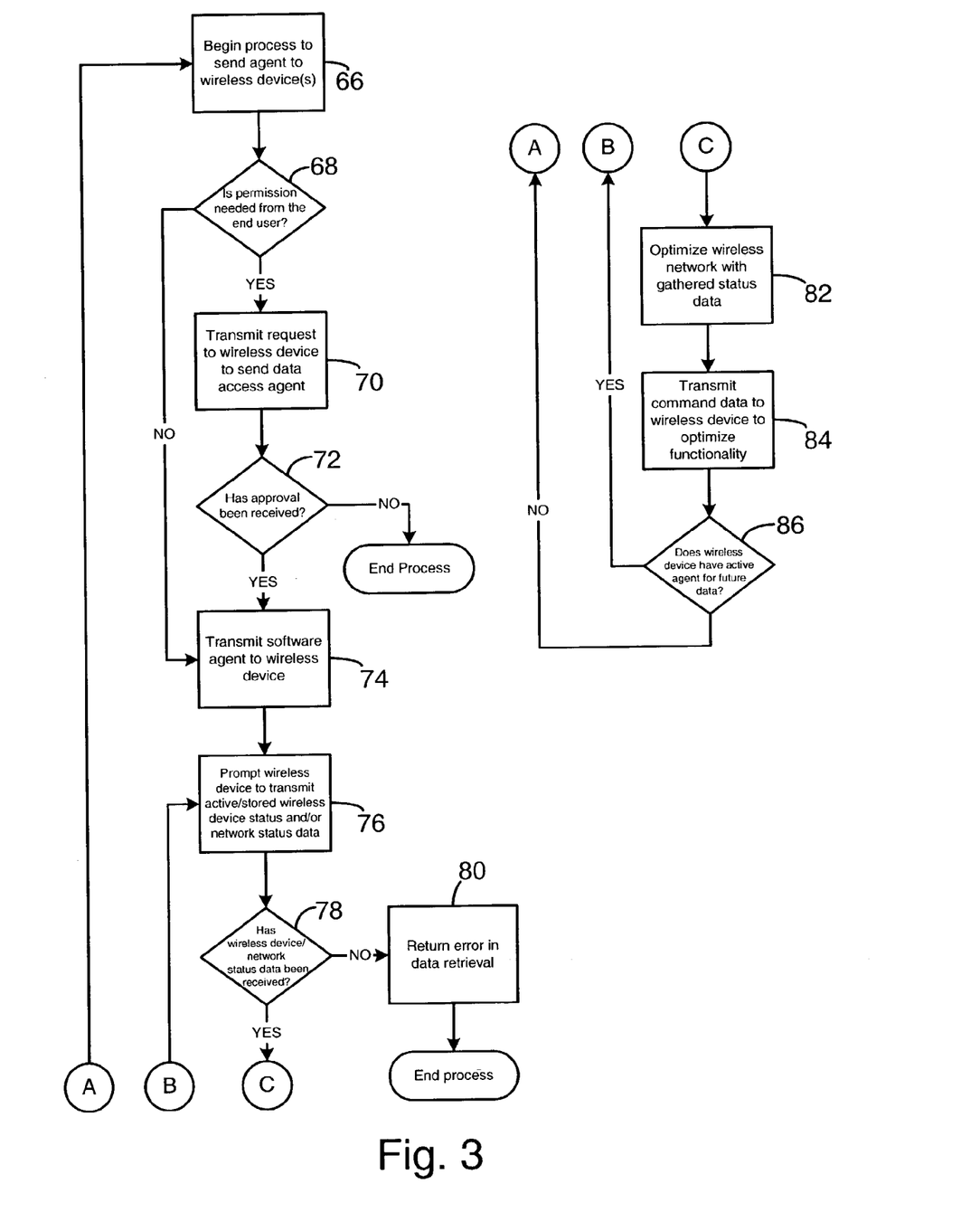
FIG. 3 is a flowchart illustrating one embodiment of the process executing on a wireless device status data-gathering server in communication with wireless devices across the network and gathering status data from the resident diagnostic interfaces of the wireless devices.

The specific process of the program executing on the server 16 for optimizing the wireless network 14 through use of the wireless device resident diagnostic interface is shown in the flowchart of FIG. 3. The process to send a data access agent to the wireless device starts, as shown at step 66, and a determination is made as to whether permission is required of the enduser to have the application pushed thereto, as shown at decision 68. In another embodiment, a simple notification of the end-user may be all that is necessary to permit pushing of the application. If the end-user permission is required at decision 68, then a request to send a data access application (agent) is sent to a wireless device 12,18,20,22, as shown at step 70. Otherwise, if end-user permission is not required at decision 68, then the agent is pushed to the wireless device, as shown at step 74. Returning to step 70, afterwards the server 16 makes a determination as to whether an approval to transmit the agent has been received from the wireless device 12,18,20,22, as shown at decision 72. If the approval has not been received at the server 16, then the process ends. Otherwise, if the approval has been received at the server 16 at decision 72, then the data access agent is transmitted to the wireless device 12,18,20,22 as shown at step 74, and then the wireless device 12,18,20,22 is prompted to transmit status data to the server 16, as shown at step 76. The prompting can be for any active status data, or any data stored at the wireless device 12,18, 20,22, or both.

A determination is made as to whether the status data has been received at the server 16, as shown at decision 78. If the status data has not been received, then an error is returned to the calling process, as shown at step 80, and the process ends. Otherwise, if the status data has been received at the server 16 at decision 78, then the wireless network 14 is optimized with the gathered wireless device status data, as shown at step 82. The optimization can occur on the specific server 16 that gathered the wireless device status data, or alternately, the optimization can occur on another computer device, such as data management server 34, or other wireless device, such as personal computer 22 on the wireless network 14.

As embodied here, the server 16 also transmits the optimization command data back to the wireless device 12,18, 20,22 such that the wireless device can modify its functionality in accord with the optimal network through, at least, manipulation of the diagnostic tools, as shown at step 84, although such step is preferable and not necessary to operation of the present system. After the transmission of the command data to the wireless device at step 84, a determination is made as to whether the wireless device has the requisite agents for future status data transmission, as shown at decision 86. If the wireless device 12,18,20,22 does have the proper network optimization application or agent to transmit status data, then the process returns to step 76 and selectively prompts the wireless device to transmit status data when necessary. Otherwise, if the wireless device 12,18,20,22 does not have the requisite application or agent, then the process returns to step 66 and attempts to load the specific application or agent onto the wireless device 12,18, 20,22 with any end-user permission requested.

Figure 4:
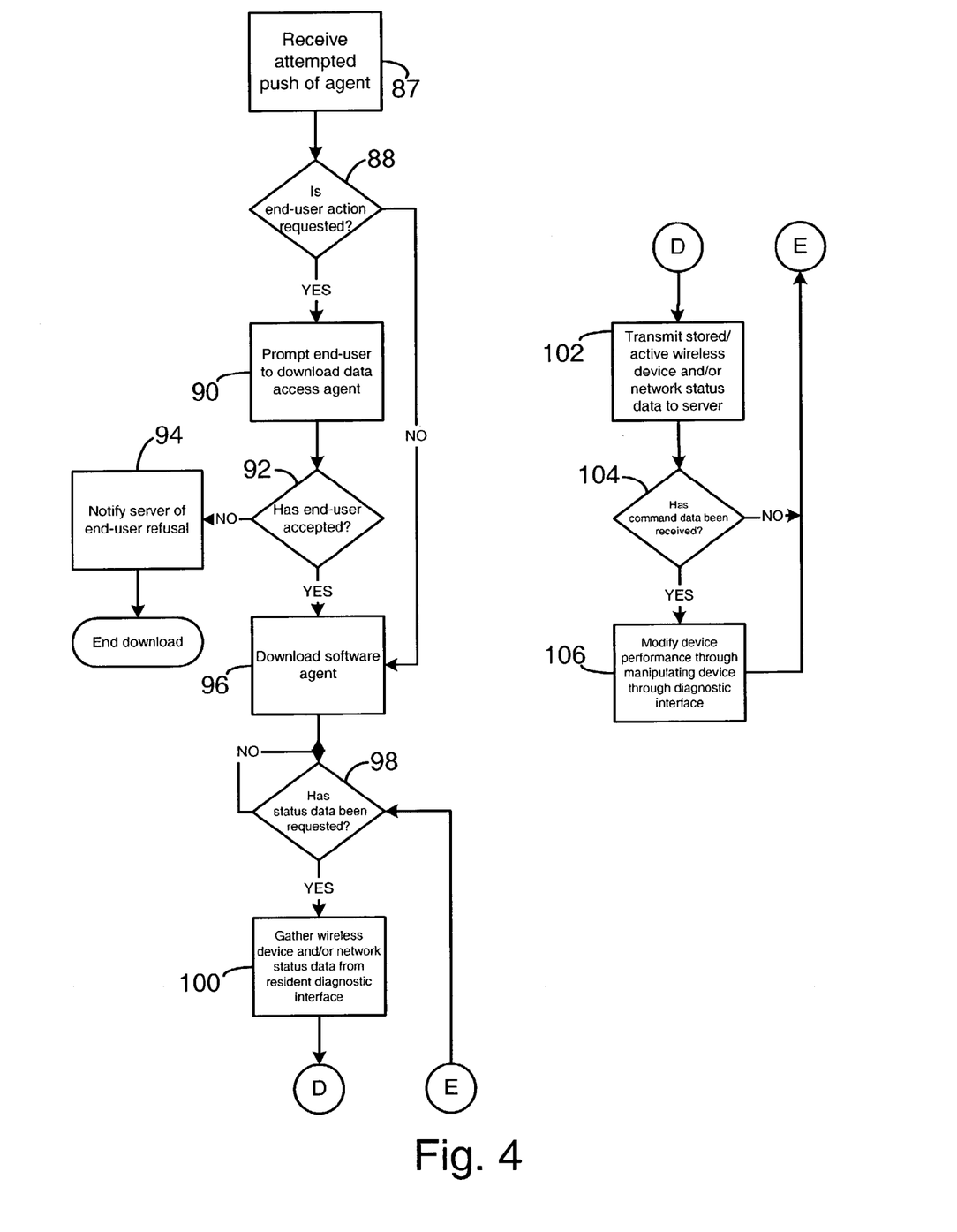
FIG. 4 is a flowchart illustrating the process executing on a wireless device receiving a software agent that accesses the resident diagnostic interface and causes status data to be transmitted to the server of FIG. 3.

FIG. 4 is a flowchart illustrating the process executing upon the computer platform 50 of a wireless device 12,18, 20,22 in tandem with the process executing on the server 16 shown in the flowchart of FIG. 3. The wireless device 12,18,20,22 receives the attempted push of the agent, as shown at step 87, and then makes a determination as to whether end-user action is requested for the push attempt, as shown at decision 88. If end-user interaction is not requested, then the process forwards to step 96 and downloads the pushed agent. Otherwise, if end-user action is requested, the wireless device and prompts (or notifies) the end-user to download the network optimization application or agent, as shown at step 90. It should be noted that such prompting could occur from an application installed on the wireless device 12,18,20,22 at manufacture and which prompts the end-user thereof for download permission during device configuration or at some other predefined moment. A determination is then made as to whether the end-user has accepted the download, as shown at decision 92. If not, the server 16 is notified of the end-user refusal to download the network optimization application or agent, as shown at step 94, and the download process terminates. Otherwise, if the end-user has accepted the download at decision 92, then the network optimization application or agent is downloaded (and preferably installed shortly thereafter) as shown at step 96.

A determination is then made as to whether the status data has been requested, as shown at decision 98, such request coming from server 16 at step 70 in FIG. 3. If no request has been made, then the thread process returns to decision 98 to enter a wait-state until the status data is requested. Otherwise, if the status data has been requested at decision 98, then active status data can be gathered from the resident diagnostic interface, as shown at step 100, and the status data is transmitted to the requesting server 16 or other computer device on the wireless network 14, as shown at step 102. At step 102, if the system 10 is embodied so as to store the status data, such stored status data can be gathered and forwarded at this time. Then a determination is made as to whether command data for network optimization has been sent from the server 16, as shown at decision 104. Such step corresponds to the command data transmission step 84 of the server 16 in FIG. 3, and is only one embodiment that can optimize the network through wireless device modification. If command data has been received at decision 104, then the wireless device 12,18,20,22 performance is modified based upon the received command data at least manipulating the device through the diagnostic interface to alter wireless device performance or operation, as shown at step 106. If there is no command data received at decision 104, or after wireless device modification at step 106, the process returns to determine if status data has been requested at decision 98. If the data access application or agent is only temporarily active, then the process will end after step 106, and will only resume upon the redownload of a data access application, i.e. return to step 90.

FIG. 5 is an architecture diagram of the interaction between the carrier side devices and the diagnostic interface resident at the wireless device 12,18,20,22. On the wireless device 12,18,20,22 side, the resident applications 110 include a diagnostic interface application 112 which allows the remote access of the diagnostic interface 118 of the chipset operating system (OS) 120. In this embodiment, the Device OS 114 includes an application programming interface (API) extension to interface with the resident diagnostic interface 118 of the chipset OS 120. Thus, the wireless device 12,18,20,22 can access the application download server 122 or other carrier-side, service providing device, and also transmit data to the carrier side, either with the application or service download, or independently therefrom.

While the diagnostic interface 118 is accessed through a software application extension in this embodiment, the interface can alternately be constructed in hardware or firmware, or combinations thereof with software. The importance of the interface is that the resident diagnostic interface 118, which is typically only accessible via a hardwire connection during manufacture or servicing, is accessible remotely such that the carrier or other network entity can access the diagnostic data and/or commands across the network, without a hardwire connection.

The data generated from the diagnostic interface 118 of the wireless device 12,18,20,22 can then be uploaded from the wireless device through a standard HTTP, such as shown at block 124, or other FTP or data transfer protocols can be used. The device data is then gathered at a data server 126 and can be stored there or other processes can be executed thereupon, such as by post processor 130, which can include canonization, normalization, data mining or other process. Other business or commercial systems, shown by block 128, can access the gathered data, preferably in a monitored fashion such as through a user manager 132 to maintain security and/or integrity of the data of the data server 126. Other computer devices, both storage and processing, can be located on the carrier side, and accordingly, the carrier architecture is readily scalable.

The present system therefore provides a method for remotely interacting with a diagnostic interface 118 of a wireless device 12,18,20,22 across a wireless network 14, comprising the steps of establishing a wireless network 14 having at least data communication between computer devices selectively connected thereto, at least one of the computer devices a remotely located wireless device 12,18, 20,22 including a computer platform 50, possibly having an end-user thereof, and the wireless device 12,18,20,22 including a resident diagnostic interface 118 through which at least status data include the wireless device status of the operating parameters of the wireless device and/or network 14 status data is accessible. Then the method can include the steps of accessing the wireless device diagnostic interface 118 from another computer device, such as server 16, across the wireless network 14, and gathering at least the status data of the wireless device 12,18,20,22 through the wireless device diagnostic interface 118. The method can further include the steps of selectively transmitting status data from at least one wireless device 12,18,20,22 to at least one other computer device, such as server 16, on the wireless network 14, and receiving the transmitted status data at the at least one other computer device.

The method can include the step of optimizing the wireless network 14 based upon the received status data, and the step of transmitting wireless status data can occur from the execution of an application resident on the computer platform 50 of the at least one wireless device that accesses the diagnostic interface, such as diagnostic interface application 112. The method can also. include the steps of transmitting command data across the wireless network 14 to the at least one wireless device 12,18,20,22, receiving the command data at the diagnostic interface 118 of the at least one wireless device, and modifying the wireless device operation through manipulation of operating parameters based upon the received command data. Further, the method can include the step of pushing or pulling an application onto the computer platform 50 of the at least one wireless device 12,18,20,22 to provide access of one or more computer devices on the wireless network 14 to the diagnostic interface 118 of that wireless device, such as pushing diagnostic interface application 112 onto cellular telephone 12.

In one embodiment, the system can be implemented solely on the wireless device 12,18,20,22 that provides remote access to its resident diagnostic interface. The wireless device can have at least one application or agent resident (either permanent or temporarily) on the computer platform 50 thereof which causes the gathering of status data from the resident diagnostic tools, such as diagnostic interface application 112, which can effect selective transmission of the status data for that wireless device to another computer device (such as server 16) on the wireless network 14. If the wireless device 12,18,20,22 is so embodied, the wireless device status data and/or network data is transmitted over an open communication connection from the wireless device 12,18,20,22 to the wireless network 14, such as an open voice or data call. If the wireless device is a cellular telephone 12 and the wireless network is a cellular telecommunication network, such as shown in FIG. 2, the network status data can be transmitted through short message service or other wireless communication methods.

In view of the method being executable on the computer platforms of a wireless device 12,18,20,22, and a server 16, the method includes a program resident in a computer readable medium, where the program directs a computer device 12,18,20,22 having a device platform 50 to perform the steps of the method. Such program can be executed on any single computer platform, or can be multithreaded among several computer platforms. Furthermore, the method can be implemented by a program that directs a computer device such as server 16 to perform the steps of optimizing the network through gathering and processing status data from the wireless devices 12,18,20,22.

The computer readable medium can be the memory 56 of the computer platform 50 of the cellular telephone 12, or other wireless device 18,20,22, or can be in a local database, such as local database 58 of the device platform 50. Further, the computer readable medium can be in a secondary storage media that is loadable onto a wireless device computer platform, such as a magnetic disk or tape, optical disk, hard disk, flash memory, or other storage media as is known in the art.

In the context of FIGS. 3 and 4, the present method may be implemented, for example, by operating portion(s) of the wireless network 14 and/or LAN 30 to execute a sequence of machine-readable instructions, such as device platform 50 and server 16. The instructions can reside in various types of signal-bearing or data storage primary, secondary, or tertiary media. The media may comprise, for example, RAM (not shown) accessible by, or residing within, the components of the wireless network 14 or LAN 30. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system for remote interaction with a resident diagnostic interface of a wireless device, comprising:
    a wireless network having at least data communication from computer devices selectively connected thereto; and
    a plurality of wireless devices located remotely from each other and each in selective communication with other computer devices across the wireless network, each wireless device including a computer platform including a software extension operable to send commands to a resident diagnostic interface, located at a resident layer on the respective wireless device and including at least one resident diagnostic tool, for at least accessing status data in the at least one diagnostic tool, wherein the status data is comprised of device status data for the operating parameters of the wireless device and network status data, and the resident diagnostic interface being selectively accessible by other computer devices across the wireless network only via the software extension.

2. The system of claim 1, wherein the resident diagnostic interface of each wireless device further allows the manipulation of the operating parameters of that wireless device, and further comprising a server on the wireless network, wherein the server is operable to receive the status data from the plurality of wireless devices, and wherein the server comprises an optimizer operable to optimize the wireless network based on the status data from the plurality of wireless devices and to generate optimization command data operable to modify a functionality of a respective wireless device in accord with the optimized wireless network.

3. The system of claim 2, wherein at least one network optimization application is resident on the computer platform of each wireless device that selectively accesses the status data, and causes the wireless device to selectively transmit the status data to another computer device on the wireless network.

4. The system of claim 1, wherein an application resident at the wireless devices causes the transmission of the status data from the diagnostic interface of that wireless device to another computer device across the wireless network.

5. The system of claim 1, wherein the status data is transmitted over an open communication connection from the wireless device to the wireless network.

6. The system of claim 1, wherein the wireless device is a cellular telephone and the wireless network is a cellular telecommunication network.

7. The system of claim 1, wherein an application that provides access to the diagnostic interface is pushed across the wireless network to the computer platform of the wireless device.

8. The system of claim 1, wherein the wireless device selectively pulls an application that provides access to the diagnostic interface from another device across the wireless network onto the computer platform of the wireless device.

9. The system of claim 2, wherein the server is further operable to transmit the optimization command data to the diagnostic interface of a specified one of the plurality of wireless devices to manipulate the wireless device operating parameters to modify wireless device operation and thereby optimize the wireless network, wherein the optimization command data is specific to the specified wireless device based on the status data received from the specified wireless device.

10. The system of claim 1, wherein the status data is stored at the wireless device and selectively transmitted to another computer device across the wireless network.

11. The system of claim 7, wherein the wireless device includes an end-user thereof, and the end-user is notified of the application being pushed thereto.

12. A system for remotely interacting with a diagnostic interface means resident on a wireless device, comprising:
    a network means for providing a wireless network communicating at least data and having one or more computer devices communicating thereacross;
    a plurality of wireless communication means for communicating at least data to other computer devices across the wireless network; and
    means operable to send commands to a resident diagnostic interface means, located at a resident layer on each respective wireless communication means and including at least one resident diagnostic tool, for at least providing access to status data in the at least one diagnostic tool, wherein the status data comprises device status data for the operating parameters of the wireless communication means and network status data for the network means, the diagnostic means accessible by the one or more computer devices across the wireless network only via the means operable to send commands.

13. A method for remotely interacting with a diagnostic interface of a wireless device across a wireless network, comprising the steps of:
    communicating between computer devices selectively connected across a wireless network having at least data communication thereacross, at least one of the computer devices a remotely located wireless device including a computer platform including a software extension operable to send commands to a resident diagnostic interface, located at a resident layer on the respective wireless device and including at least one resident diagnostic tool, for at least accessing status data in the at least one diagnostic tool, wherein the status data is comprised of device status data of the operating parameters of the wireless device, and network status data;
    accessing the wireless device diagnostic interface from another computer device across the wireless network only via the software extension; and
    gathering the status data through the wireless device diagnostic interface.

14. The method of claim 13, further comprising the steps of:
    selectively transmitting status data from the at least one wireless device to at least one other computer device on the wireless network; and
    receiving the transmitted status data at the at least one other computer device.

15. The method of claim 13, further comprising the step of optimizing the wireless network based upon the received status data and generating optimization command data operable to modify a functionality of a respective wireless device in accord with the optimized wireless network.

16. The method of claim 14, wherein the step of transmitting status data occurs from the execution of an application resident on the computer platform of the at least one wireless device that accesses the diagnostic interface.

17. The method of claim 14, wherein the step of transmitting the status data from the at least one wireless device is transmitting the status data to a server across the wireless network.

18. The method of claim 15, further comprising the steps of:
transmitting the optimization command data across the wireless network to a specified one of the at least one wireless device, wherein the optimization command data is specific to the specified wireless device based on the status data gathered from the specified wireless device;
receiving the optimization command data at the diagnostic interface of the specified one of the at least one wireless device; and
modifying the specified wireless device operation through manipulation of operating parameters based upon the received optimization command data.

19. The method of claim 13, further comprising the step of pushing an application onto the computer platform of the at least one wireless device to provide access of one or more computer devices on the wireless network to the diagnostic interface of that wireless device.

20. The method of claim 13, further comprising the step of pulling an application that provides access to the diagnostic interface from another device across the wireless network onto the computer platform of the wireless device.

21. The method of claim 13, further comprising the step of storing status data at the wireless device prior to selective transmission of the stored status data to another computer device across the wireless network.

22. The method of claim 19, wherein the wireless device includes an end-user thereof, and further comprising the step of notifying the end-user that the application is being pushed thereto.

23. A method for remotely interacting with a diagnostic interface of a wireless device across a wireless network, comprising the steps of:
a step for communicating across a wireless network between computer devices selectively connected thereto, at least one of the computer devices a remotely located wireless device including a computer platform including a software extension operable to send commands to a resident diagnostic interface, located at a resident layer on the respective wireless device and including at least one resident diagnostic tool, for at least accessing status data in the at least one diagnostic tool, wherein the status data is comprised of device status data of the operating parameters of the wireless device, and network status data;
a step for accessing the wireless device diagnostic interface from another computer device across the wireless network only via the software extension; and
a step for gathering at least status data of the wireless device through the wireless device diagnostic interface.

24. A wireless device in selective communication with other computer devices across a wireless network, the wireless device including a software extension operable to send commands to a resident diagnostic interface, located at a resident layer on the respective wireless device and including at least one resident diagnostic tool, for at least accessing status data in the at least one diagnostic tool, wherein the status data is comprised of at device status data of the operating parameters of the wireless device, and network status data, and the diagnostic interface selectively accessible to other computer devices across the wireless network only via the software extension.

25. The wireless device of claim 24, further comprising a data access application resident on the computer platform of the wireless devices, the data access application causing the selective transmission of the status data for that wireless device from the diagnostic interface to another computer device on the wireless network.

26. The wireless device of claim 24, wherein the status data is transmitted over an open communication connection from the wireless device to the wireless network.

27. The wireless device of claim 24, wherein the wireless device is a cellular telecommunication device and the wireless network is a cellular telecommunication network.

28. The wireless device of claim 25, wherein the wireless device selectively loads a data access application that is pushed across the wireless network to the computer platform of the wireless device.

29. The wireless device of claim 24, wherein the status data comprises at least a part of an input to an optimizer to generate an optimized wireless network, wherein the diagnostic interface allows manipulation of the operating parameters of the wireless device, and wherein the wireless device is further operable to selectively receive optimization command data at the diagnostic interface from another computer device across the wireless network, wherein the optimization command data is operable by the diagnostic interface to modify a functionality of the wireless device in accord with the optimized wireless network, wherein the optimization command data is specific to the wireless device based on the status data of the wireless device.

30. The wireless device of claim 24, wherein the wireless device selectively pulls a data access application across the wireless network to the computer platform of the wireless device.

31. In a computer readable medium, a program that when executed directs a computer device on a wireless network having at least data communication between wireless communication devices selectively connected thereto, to perform the steps of:
selectively receiving status data from a resident diagnostic interface of one or more wireless communication devices, wherein the status data is accessed on each wireless communication device only via a software extension operable to send commands to the respective resident diagnostic interface, located at a resident layer on the respective wireless communication device, wherein the resident diagnostic interface includes at least one resident diagnostic tool comprising the status data, wherein the status data comprises device status data of the operating parameters of the respective wireless communication device and network status data; and
storing the received status data.

32. The program of claim 31, further directing the computer device to perform the step of pushing a data access application to the one or more wireless communication devices to provide access to the diagnostic interface of the remotely located wireless device.

33. The program of claim 31, further directing the computer device to perform the step of optimizing the wireless network based upon the received status data and generating optimization command data operable to modify a functionality of a respective wireless communication device in accord with the optimized wireless network, wherein the diagnostic interface allows manipulation of the operating parameters of the wireless communication device, and further directing the computer device to perform the step of transmitting the optimization command data to each diagnostic interface of one or more wireless communication devices to thereby modify wireless communication device operation, wherein the optimization command data is specific to each respective wireless communication device based on the status data from the respective wireless communication device.

34. In a computer readable medium, a program that when executed directs a wireless computer device on a wireless network having at least data communication between computer devices selectively connected thereto, to perform the steps of:
creating a remote interface including a software extension to access status data from a resident diagnostic interface of the wireless device, wherein the remote interface is operable to send commands to the resident diagnostic interface, located at a resident layer on the wireless device, only via the software extension, wherein the resident diagnostic interface includes at least one resident diagnostic tool comprising the status data, wherein the status data comprises device status data of the operating parameters of the wireless device and network status data, wherein the remote interface is accessible by other computer devices across the wireless network; and
selectively providing access to other computer devices across the wireless network to the resident diagnostic interface of the wireless device through the remote interface.

35. The program of claim 34, further directing the computer to perform the step of selectively transmitting the status data from the diagnostic interface of the wireless device, through the remote interface, and to at least one other computer device on the wireless network.

36. The program of claim 35, further directing the wireless device to perform the step of opening a communication connection from the at least one wireless device to the wireless network, and wherein the step of transmitting status data is transmitting the status data over the open communication connection.

37. The program of claim 34, wherein the resident diagnostic interface allows manipulation of the operating parameters of the wireless device, and further directing the wireless device to perform the steps of:
receiving optimization command data, through the remote interface and at the resident diagnostic interface, from another computer device across the wireless network, wherein the optimization command data corresponds to an optimized wireless network based at least in part on the status data from the wireless device, wherein the optimization command data is specific to the wireless device based on the status data from the wireless device; and
modifying the wireless device operation through manipulation of the operating parameters based upon the received optimization command data.

38. A wireless device, comprising:
a computer platform;
a resident diagnostic interface disposed on the computer platform at a resident layer and including at least one resident diagnostic tool; and
a software extension disposed on the computer platform and operable to send commands to the resident diagnostic interface operable to access status data in the at least one diagnostic tool, wherein the status data comprises device status data for the operating parameters of the wireless device and network status data, the resident diagnostic interface being selectively accessible by other computer devices across a wireless network only via the software extension.

39. The wireless device of claim 38, wherein the resident diagnostic interface further allows the manipulation of the operating parameters of the wireless device, wherein the status data comprises at least a part of an input to an optimizer operable to optimize the wireless network and to generate optimization command data for the wireless device in accord with the optimized wireless network, wherein the resident diagnostic is operable to receive the optimization command data and modify a functionality of the wireless device in accord with the optimized wireless network.

40. The wireless device of claim 39, further comprising an optimization application resident on the computer platform, the optimization application operable to selectively access the status data, and operable to cause the wireless device to selectively transmit the status data to another computer device on the wireless network.

41. The wireless device of claim 38, further comprising an application resident on the computer platform, wherein the application is operable to cause a transmission of the status data from the diagnostic interface to another computer device across the wireless network.

42. The wireless device of claim 38, wherein the wireless device is operable to transmit the status data over an open communication connection from the wireless device to the wireless network.

43. The wireless device of claim 38, wherein the wireless device is a cellular telephone and the wireless network is a cellular telecommunication network.

44. The wireless device of claim 38, further comprising an application that provides access to the diagnostic interface, the application being pushed onto the computer platform of the wireless device from across the wireless network.

45. The wireless device of claim 38, further comprising an application that provides access to the diagnostic interface, the wireless device selectively pulling the application from another device across the wireless network.

46. The wireless device of claim 39, wherein the wireless device is operable to transmit the status data to a server on the wireless network, wherein the server comprises the optimizer.

47. The wireless device of claim 46, wherein the optimization command data is specific to the wireless device based on the status data from the wireless device.

48. The wireless device of claim 38, wherein the status data is stored at the wireless device and selectively transmitted to another computer device across the wireless network.

49. The wireless device of claim 44, further comprising an end-user notification of the application being pushed thereto.

50. A wireless device for communicating on a wireless network, comprising:
a computer means,
a diagnostic interface means resident on the computer means at a resident layer and including at least one resident diagnostic tool; and an extension means disposed on the computer means and operable to send commands to the diagnostic interface means operable to provide access to status data in the at least one diagnostic tool, wherein the status data comprises device status data for the operating parameters of the wireless device and network status data, and the diagnostic means being accessible by another computer device across the wireless network only via the extension means.

51. A method for remotely interacting with a wireless device, comprising:
 accessing, from across a wireless network, a software extension disposed on the computer platform and operable to send commands to a diagnostic interface resident at a resident layer on a computer platform of a wireless device, the resident diagnostic interface providing access to status data in at least one resident diagnostic tool, the status data comprising device status data for the operating parameters of the wireless device and network status data; and
 gathering the status data through the diagnostic interface only via the software extension.

52. The method of claim 51, wherein gathering the status data further comprises receiving the status data at another computer device across the wireless network based on selective transmissions from the wireless device.

53. The method of claim 51, further comprising optimizing the wireless network and generation optimization command data to optimize the wireless device in accord with the optimized wireless network based upon the received status data.

54. The method of claim 52, wherein the receiving of the status data occurs from the execution of an application resident on the computer platform of the wireless device that accesses the diagnostic interface.

55. The method of claim 52, wherein the receiving of the status data from the wireless device further comprises receiving the status data at a server across the wireless network.

56. The method of claim 53, further comprising transmitting the optimization command data across the wireless network to the wireless device, the optimization command data operable to modify the wireless device operation through manipulation of the operating parameters, wherein the optimization command data is specific to the wireless device based on the status data from the wireless device.

57. The method of claim 51, further comprising pushing an application onto the computer platform of the wireless device to provide access by one or more computer devices on the wireless network to the diagnostic interface of the wireless device.

58. The method of claim 51, further comprising receiving a request from the wireless device across the wireless network for transmission of an application downloadable onto the computer platform of the wireless device to provide access by one or more computer devices on the wireless network to the diagnostic interface of the wireless device.

59. The method of claim 57, further comprising generating an end-user notification that the application is being pushed thereto.

60. A method for remotely interacting with a wireless device, comprising the steps of:
 a step for accessing, from across a wireless network, a software extension disposed on the computer platform and operable to send commands to a diagnostic interface resident at a resident layer on a computer platform of a wireless device, the resident diagnostic interface providing access to status data in at least one resident diagnostic tool, the status data comprising device status data for the operating parameters of the wireless device and network status data; and
 a step for gathering the status data through the diagnostic interface only via the software extension.

61. A computer-readable medium embodying means for implementing a method for remotely interacting with a wireless device, comprising:
 at least one sequence of instructions, wherein execution of the instructions by a processor causes the processor to perform the acts as claimed in claim 51.

62. A computer-readable medium embodying means for implementing a method for remote interaction with a wireless device, comprising:
 at least one sequence of instructions, wherein execution of the instructions by a processor causes the processor to perform the acts of:
  creating a remotely accessible interface including a software extension operable to send commands to a resident diagnostic interface at a resident layer on a computer platform of the wireless device, the diagnostic interface operable to provide access only via the software extension to status data in at least one resident diagnostic tool of the diagnostic interface, the status data comprising device status data for the operating parameters of the wireless device and network status data, the remotely accessible interface accessible by other computer devices across a wireless network; and
  selectively providing access to the other computer devices across the wireless network to the diagnostic interface of the wireless device through the remotely accessible interface.

63. The medium of claim 62, further causing the processor to perform the act of selectively transmitting the status data from the diagnostic interface of the wireless device, through the remotely accessible interface, and to at least one other computer device on the wireless network.

64. The medium of claim 63, further causing the processor to perform the act of opening a communication connection from the at least one wireless device to the wireless network, and wherein the action of transmitting status data is transmitting the status data over the open communication connection.

65. The medium of claim 62, wherein the diagnostic interface allows manipulation of the operating parameters of the wireless device, and further causing the processor to perform the act of:
 receiving optimization command data, through the remotely accessible interface and at the diagnostic interface, from another computer device across the wireless network, wherein the optimization command data is operable to optimize the wireless device in accord with an optimized wireless network determined at least in part from the status data; and
 modifying the wireless device operation through manipulation of the operating parameters based upon the received optimization command data, wherein the optimization command data is specific to the wireless device based on the status data from the wireless device.

66. An apparatus for remotely interacting with a wireless device, comprising:
 a server operable to access, from across a wireless network, a software extension disposed on the computer platform and operable to send commands to a diagnostic interface resident at a resident layer on a computer platform of a wireless device, the resident diagnostic interface providing access to status data in at least one resident diagnostic tool of the diagnostic interface, the status data comprising device status data for the operating parameters of the wireless device and network status data; and wherein the server is further operable to gather the status data through the diagnostic interface only via the software extension.

67. The apparatus of claim 66, further operable to optimize the wireless network and generate optimization command data to optimize the wireless device in accord with the optimized wireless network based upon the received status data.

68. The apparatus of claim 67, further operable to receive the status data in response to the execution of an application resident on the computer platform of the wireless device that accesses the diagnostic interface.

69. The apparatus of claim 66, further operable to transmit the optimization command data across the wireless network to the wireless device, the optimization command data operable to modify the wireless device operation through manipulation of the operating parameters, wherein the optimization command data is specific to the wireless device based on the status data from the wireless device.

70. The apparatus of claim 66, further operable to push an application onto the computer platform of the wireless device to provide access by one or more computer devices on the wireless network to the diagnostic interface of the wireless device.

71. The apparatus of claim 66, further operable to receive a request from the wireless device across the wireless network for transmission of an application downloadable onto the computer platform of the wireless device to provide access by one or more computer devices on the wireless network to the diagnostic interface of the wireless device.

72. The apparatus of claim 70, further operable to transmit an end-user notice to the wireless device indicating a push of the application to the wireless device.

73. An apparatus for remotely interacting with a wireless device, comprising:
  means for accessing, from across a wireless network, a software extension disposed on the computer platform and operable to send commands to a diagnostic interface resident at a resident layer on a computer platform of a wireless device, the resident diagnostic interface providing access to status data in at least one resident diagnostic tool of the diagnostic interface, the status data comprising device status data for the operating parameters of the wireless device and network status data; and
  means for gathering the status data through the diagnostic interface only via the software extension.

74. A method of operation of a wireless device, composing:
  accessing status data resident in at least one resident diagnostic tool of a resident diagnostic interface at a resident layer on the wireless device only via a software extension disposed on the wireless device and operable to send commands to the resident diagnostic interface, the status data comprising device status data for the operating parameters of the wireless device and network status data relating to a wireless network on which the wireless device is operable; and
  transmitting the status data to another computer device across the wireless network.

75. The method of claim 74, further comprising receiving optimization command data generated by an optimizer in accord with an optimized wireless network based at least in part on the status data, and further comprising manipulating the operating parameters of the wireless device based on the received optimization command data.

76. The method of claim 74, further comprising receiving optimization command data transmitted across the wireless network, wherein the optimization command data are generated by an optimizer in accord with an optimized wireless network based at least in part on the status data, wherein the optimization command data is specific to the wireless device based on the status data from the wireless device, and wherein the optimization command data is operable to manipulate the wireless device operating parameters to modify wireless device operation based on the transmitted status data.

77. A computer-readable medium embodying means for implementing a method for operation of a wireless device, the method comprising:
  accessing status data resident in at least one resident diagnostic tool of a resident diagnostic interface at a resident layer on the wireless device only via a software extension disposed on the wireless device and operable to send commands to the resident diagnostic interface, the status data comprising device status data for the operating parameters of the wireless device and network status data relating to a wireless network on which the wireless device is operable; and
  transmitting the status data to another computer device across the wireless network.

78. The wireless device of claim 39, wherein the status data further comprises wireless device state data.

79. The method of claim 53, wherein the status data further comprises wireless device state data.

80. The wireless device of claim 67, wherein the status data further comprises wireless device state data.

81. The method of claim 75, wherein the status data further comprises wireless device state data.

* * * * *